April 5, 1949.    W. T. SIMMONS    2,466,490
THREAD TRIANGLES
Filed June 17, 1947
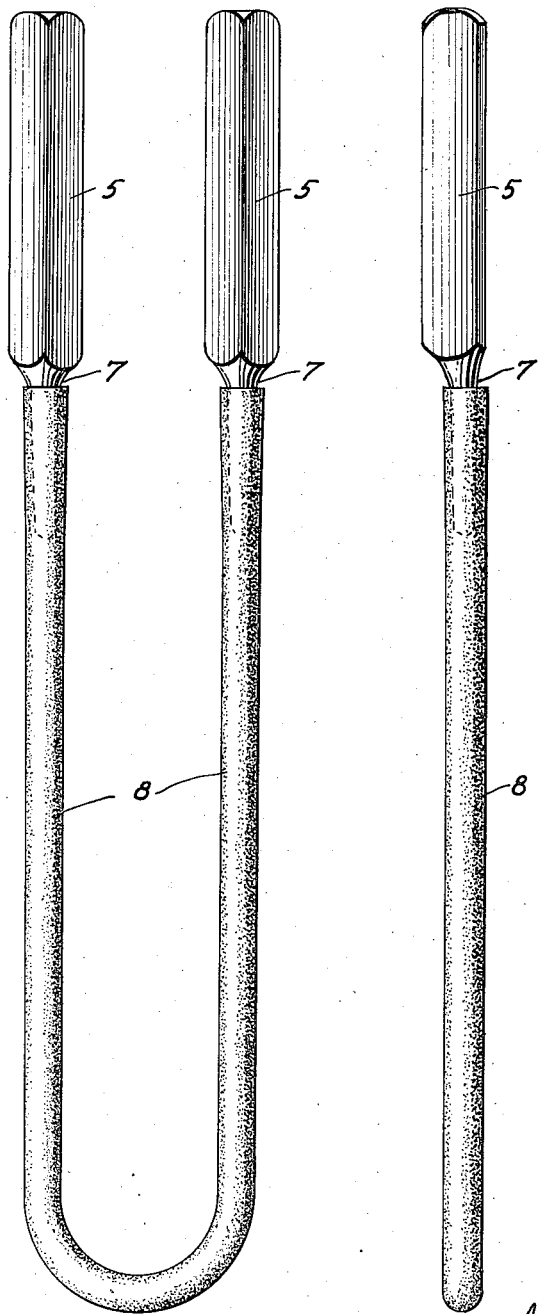
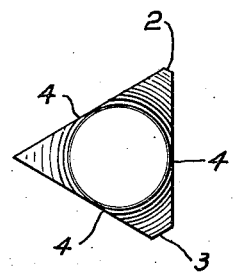
Fig. 3.
Fig. 1.    Fig. 2.
INVENTOR
William Trowbridge Simmons Patented Apr. 5, 1949

2,466,490

UNITED STATES PATENT OFFICE 2,466,490

THREAD TRIANGLES

William Trowbridge Simmons, Amarillo, Tex.

Application June 17, 1947, Serial No. 755,039

1 Claim. (Cl. 33—199)

The invention is herewith explained in detail with the use of the attached print. Figure 1 is a front view of the device. Figure 2 is a side view. Figure 3 is an end view of the triangles. Like elements are numbered alike. Number 5 is the triangle element as a whole except for the end numbered 7 which is ground to a cylindrical shape of such size to allow the plastic tube 8 commonly called spaghetti to fit closely.

The invention is composed of triangles 5 tied together by spaghetti. Each of the triangles is ground flat on two of its edges 2 and 3. The two truncations being unequal to compensate for the flats designated in the different forms of 60 degree threads, one edge on each triangle being left sharp to facilitate the measuring of sharp V threads. Any point on this instrument can be used that will clear the flat as designated in the thread being cut as they are all 60 degrees.

To measure a thread with this instrument place the triangles in the thread opposite each other, and measure across the flat tops 4 that protrude above the diameter of the piece being measured. It is essential that a chart accompany each pair of triangles with a constant quoted on it for each pitch thread that can be cut with the said pair.

*Example.*—To cut a 2.350–12 thread, we note that the constant for 12 pitch on this set of triangles is 377. Therefore the thread should measure 2.350 plus .377 or 2.727 between the protruding flat portions of the triangles which extend above the diameter of the piece being measured.

I claim:

A thread gauge for use with a micrometer caliper comprising a pair of equiangular triangular prismatic gauge blocks each having two edges so truncated that the side faces of the prisms are of unequal width, one end of each gauge block having a substantially cylindrical extension, and a tubular flexible element secured at each end over the corresponding extension of one of said gauge blocks.

WILLIAM TROWBRIDGE SIMMONS.

REFERENCES CITED

The following references are of record in the file of this patent:

UNITED STATES PATENTS

| Number | Name | Date |
| --- | --- | --- |
| 533,872 | Ebert | Feb. 12, 1895 |
| 1,331,794 | Wolf | Feb. 24, 1920 |
| 1,336,189 | Bechler | Apr. 6, 1920 |
| 1,365,286 | Sjokvist | Jan. 11, 1921 |